(12) United States Patent
Huang

(10) Patent No.: US 10,082,286 B1
(45) Date of Patent: Sep. 25, 2018

(54) COOLING FAN WITH LIGHT-EMITTING EFFECT

(71) Applicant: Dynaeon Industrial Co., LTD., Taipei (TW)

(72) Inventor: Taichi Huang, Taipei (TW)

(73) Assignee: DYNAEON INDUSTRIAL CO., LTD., Taipei (TW)

( * ) Notice: Subject to any disclaimer, the term of this patent is extended or adjusted under 35 U.S.C. 154(b) by 0 days.

(21) Appl. No.: 15/879,128

(22) Filed: Jan. 24, 2018

(51) Int. Cl.
| | |
|---|---|
| *F21V 33/00* | (2006.01) |
| *F04D 29/00* | (2006.01) |
| *F21V 8/00* | (2006.01) |
| *F21V 5/04* | (2006.01) |
| *F04D 29/52* | (2006.01) |
| *F21V 19/00* | (2006.01) |
| *F04D 25/06* | (2006.01) |

(52) U.S. Cl.
CPC ...... *F21V 33/0096* (2013.01); *F04D 25/0613* (2013.01); *F04D 29/005* (2013.01); *F04D 29/522* (2013.01); *F21V 5/048* (2013.01); *F21V 19/003* (2013.01); *G02B 6/0051* (2013.01); *G02B 6/0078* (2013.01)

(58) Field of Classification Search
CPC .. F04D 29/005; F04D 29/582; F04D 25/0613; F21V 33/0096; F21V 33/0088; F24F 13/078
See application file for complete search history.

(56) References Cited

U.S. PATENT DOCUMENTS

| | | | | |
|---|---|---|---|---|
| 6,790,003 | B1* | 9/2004 | Hu | F04D 25/0613 |
| | | | | 415/118 |
| 7,037,073 | B2* | 5/2006 | Lin | F04D 25/0613 |
| | | | | 362/500 |
| 9,777,918 | B1* | 10/2017 | Wen | F21V 33/0096 |
| 2003/0231956 | A1* | 12/2003 | Lin | F04D 29/582 |
| | | | | 415/118 |
| 2007/0248476 | A1* | 10/2007 | Lewis | F04D 25/0613 |
| | | | | 417/423.1 |
| 2011/0058945 | A1* | 3/2011 | Hu | F03B 17/061 |
| | | | | 362/157 |

* cited by examiner

*Primary Examiner* — Mariceli Santiago
(74) *Attorney, Agent, or Firm* — Muncy, Geissler, Olds & Lowe, P.C.

(57) ABSTRACT

A cooling fan having a light-emitting effect comprises a frame body, a light-emitting assembly and a fan blade assembly, wherein the frame body has a base and an upper cover. The light-emitting assembly is mounted on the frame body and includes a circuit board, a plurality of light-emitting elements capable of emitting a light respectively and a light guide plate. The light guide plate includes a plurality of light guide strips which correspond to each of the plurality of light-emitting elements respectively to guide the light, and a light diffusion portion which is connected with the plurality of light guide strips. The light diffusion portion includes a first diffusion portion in a position corresponding to each of the plurality of light guide strips. The fan blade assembly is mounted in the frame body, such that the light passes through the first diffusion portions and then forms a diffused light.

20 Claims, 10 Drawing Sheets

COOLING FAN WITH LIGHT-EMITTING EFFECT

FIELD OF THE INVENTION

The present invention relates to a cooling fan having a light-emitting effect, and in particular to a cooling fan capable of emitting light uniformly.

BACKGROUND OF THE INVENTION

A fan used in a computer is mainly used to discharge the thermal energy released by the operation of a host computer to the outside. The conventional host computer is often placed in a corner because of its monotony. In order to increase the visibility of the host computer, there are many transparent or light-emitting cases available in the market that can render the host computer different light changes, a variety of cooling fans, heat-conducting water drains and the like which can emit different light changes are provided in the host computer so as to enhance the visibility of the host computer through different light changes.

For example, U.S. Pat. No. 9,777,918 discloses a light-emitting cooling fan structure dissipating heat, wherein a circuit board is arranged in a fan body, and the circuit board is sequentially provided with a first light-guiding frame and a second light-guiding frame, and the circuit board is provided with a plurality of side-light lighting elements. Every two side-light lighting elements are reversely arranged and spaced on a rim of the circuit board. A bottom of the first light-guiding frame is annually provided with a lighting reflection layer, and the plurality of side-light lighting elements is arranged below the lighting reflection layer. The lighting reflection layer reflects light sources of the side-light lighting elements to pass through an edge to a top of the first light-guiding frame and the second light-guiding frame, thereby uniformly scattering and forming a circular light source, such that the cooling fan structure presents a unique lighting effect of a uniform annular light source.

However, the aforementioned U.S. Pat. No. 9,777,918 can provide a uniform annular light source on one side of the cooling fan. However, this patent does not provide a uniform lighting effect for the entire cooling fan. Meanwhile, the one-side lighting will make the use of the cooling fan more monotonous.

SUMMARY OF THE INVENTION

In view of this, the main objective of the present invention is to provide a cooling fan having a light-emitting effect.

According to said objective, the present invention provides a cooling fan having a light-emitting effect. The cooling fan comprises a frame body, a light-emitting assembly and a fan blade assembly. The frame body includes a base and an upper cover which is made from a light-permeable material and forms an installation space together with the base. The light-emitting assembly is mounted on the base and includes a circuit board, a plurality of light-emitting elements which are electrically connected with the circuit board and emit a light respectively, and a light guide plate. The light guide plate includes a plurality of light guide strips which correspond to each of the plurality of light-emitting elements respectively to form a guide path that guides the light, and a light diffusion portion which is connected with the plurality of light guide strips. The light diffusion portion includes a first diffusion portion in a position corresponding to each of the plurality of light guide strips, such that the light passes through the guide path to form a diffused light via the first diffusion portion, and the upper cover is in a uniform light-emitting state. The fan blade assembly is arranged in the installation space, and includes a driving unit which is electrically connected with the circuit board and a fan blade which is driven by the driving unit to rotate in the installation space.

In an embodiment, the light diffusion portion includes a first diffusion portion in a position corresponding to each of the plurality of light guide strips, such that the light passes through the guide path and then forms a diffused light using the first diffusion portions, and therefore the upper cover is in a uniform light-emitting state.

In an embodiment, the first diffusion portion is a semi-convex lens which extends outwards from the light diffusion portion.

In an embodiment, the light guide plate further comprises a central light-emitting portion in which the circuit board is arranged, and the plurality of light-emitting strips are connected between the central light-emitting portion and the light diffusion portion.

In an embodiment, the light diffusion portion further comprises a light diffusion plate, and each of the first diffusion portions is positioned on the light diffusion plate and forms a gap portion with the light diffusion portion.

In an embodiment, the first diffusion portion is a semi-concave lens surface.

In an embodiment, the plurality of light guide strips further include a plurality of first light guide strips and a plurality of second light guide strips, wherein each of the plurality of first light guide strips extends to the light diffusion portion from each of the plurality of light-emitting elements; each of the plurality of second light guide strips further comprises a first section which extends from the plurality of light-emitting elements and two second sections which extend to the light diffusion portion from the first section respectively.

In an embodiment, the diffused light further comprises a first diffused light and a second diffused light, wherein the first diffused light is formed by passing through the plurality of first light guide strips and then through the first diffusion portions; the second diffused light is formed by passing through the first sections of the plurality of second light guide strips to form two branched lights and then enabling the two branched lights to pass through the second sections and then through the first diffusion portion.

In an embodiment, a first connection portion and a second connection portion which are connected each other are further arranged between the light diffusion plate and the base.

In an embodiment, the base is further made from a light-permeable material, such that the entire frame body is in a uniform light-emitting state using the diffused light.

In an embodiment, the base further comprises a bottom plate in which the first connection portion is arranged, and a plurality of outer side plates which are annularly arranged on the bottom plate.

In an embodiment, the light diffusion portion further comprises a light diffusion plate, and a second diffusion portion is arranged in a position, which corresponds to the first diffusion portion, on the light diffusion plate; in addition, a gap portion is formed between the second diffusion portion and the first diffusion portion.

In an embodiment, the first diffusion portion is a semi-convex lens, and the second diffusion portion is a semi-concave lens portion.

In an embodiment, the diffused light further includes a first diffused light, a second diffused light and a third diffused light, wherein the first diffused light is formed by passing through the first light guide strips and then through the first diffusion portion; the second diffused light is formed by passing through the first sections of the second light guide strips to form two branched lights and then enabling the two branched lights to pass through the second sections and then through the first diffusion portion; the third diffused light is formed by enabling the first diffused light and the second diffused light to pass through the second diffused portion.

In an embodiment, a first connection portion and a second connection portion which are connected each other are further arranged between the light diffusion plate and the base.

In an embodiment, the base is further made from a light-permeable material, such that the entire frame body is in a uniform light-emitting state using the diffused light.

Through the above technical solution, compared with the prior art, the present invention can substantially achieve the following beneficial effects.

According to the present invention, the light emitted from the plurality of light-emitting elements is uniformly diffused through the convex lens portion on the light diffusion portion and the semi-concave lens surface of the gap portion, such that the entire upper cover or the entire frame body can present a uniform light-emitting state to increase the visibility when the cooling fan is used.

DETAILED DESCRIPTION OF THE PREFERRED EMBODIMENTS

Figure 1:
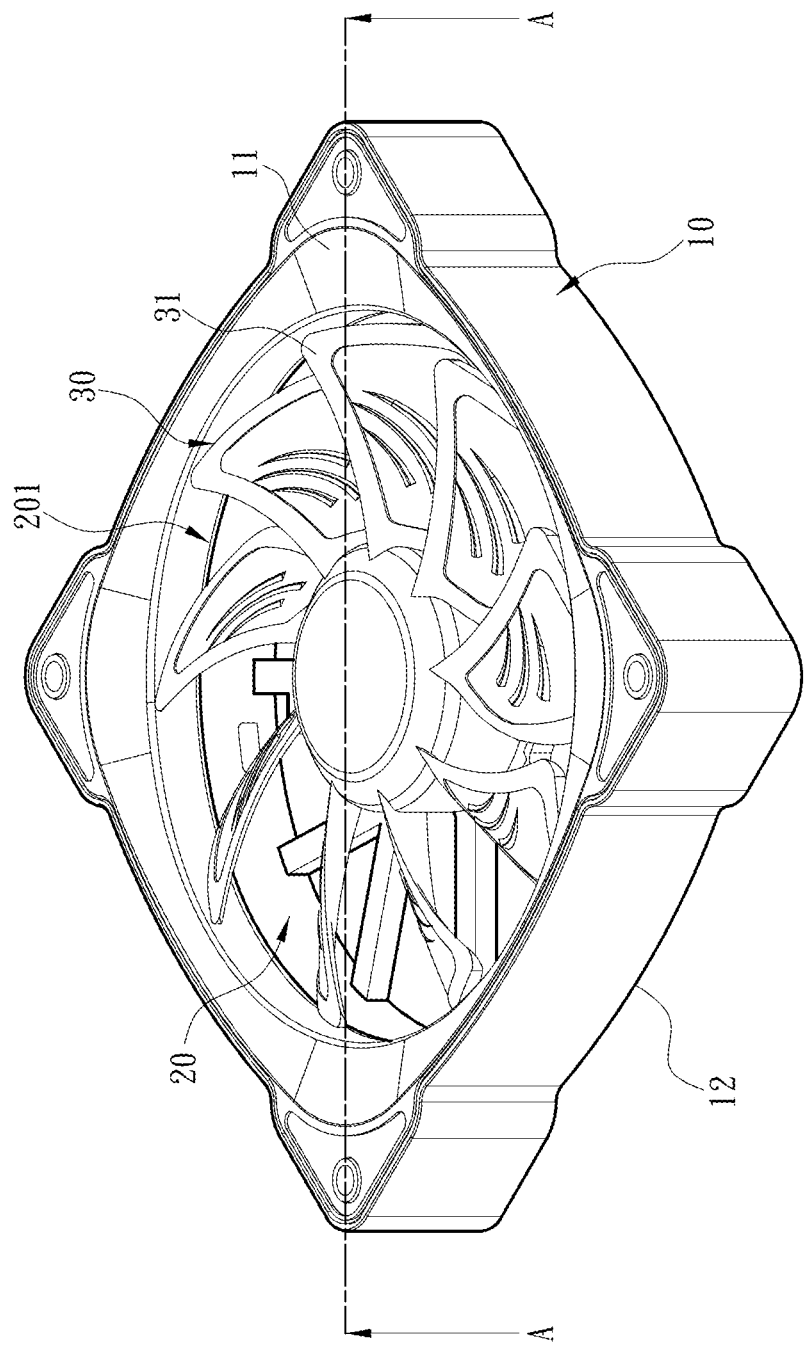
FIG. 1 is a stereoscopic schematic drawing of a first embodiment of the present invention.
Figure 2:
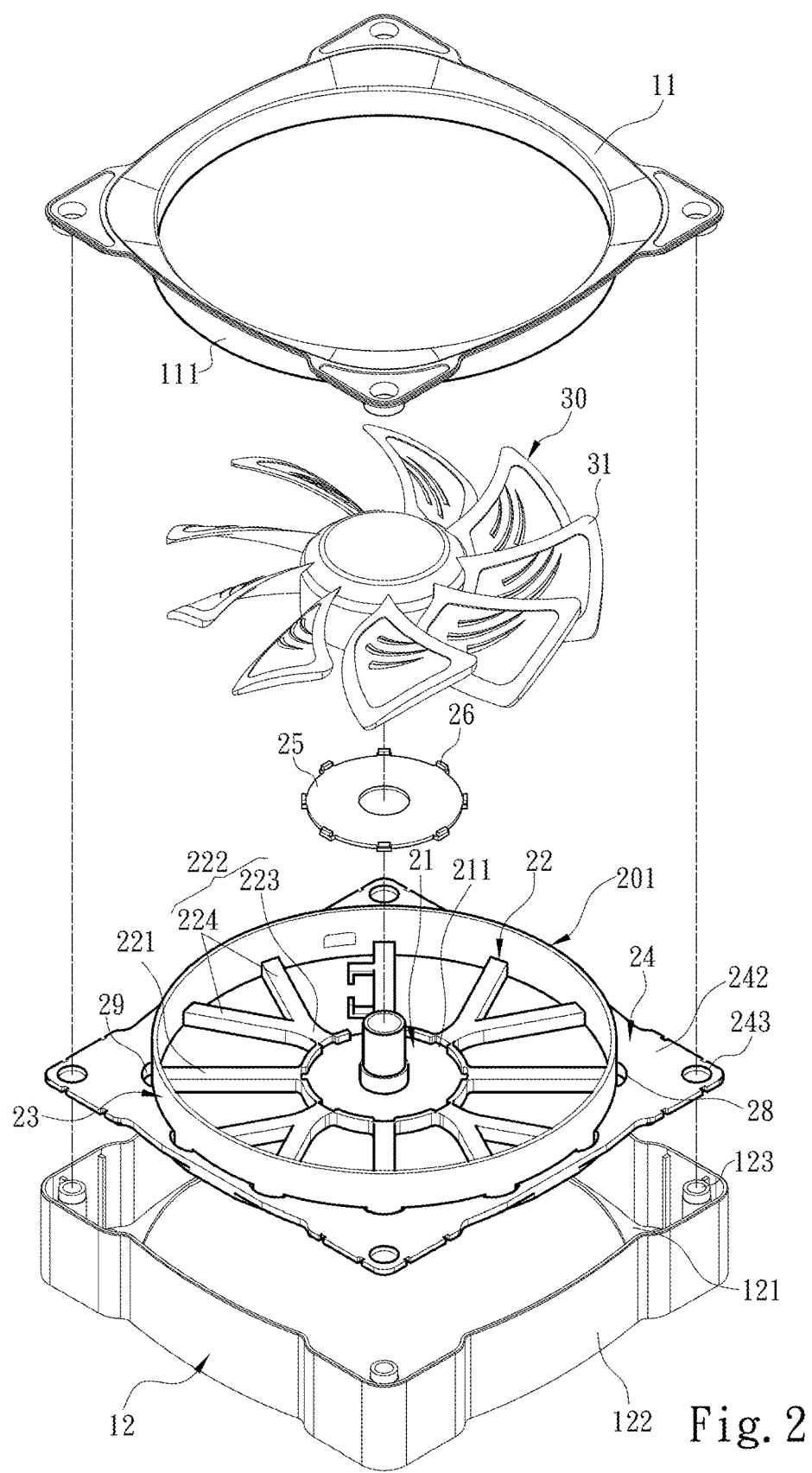
FIG. 2 is stereoscopic exploded schematic drawing of the first embodiment of the present invention.
Figure 3:
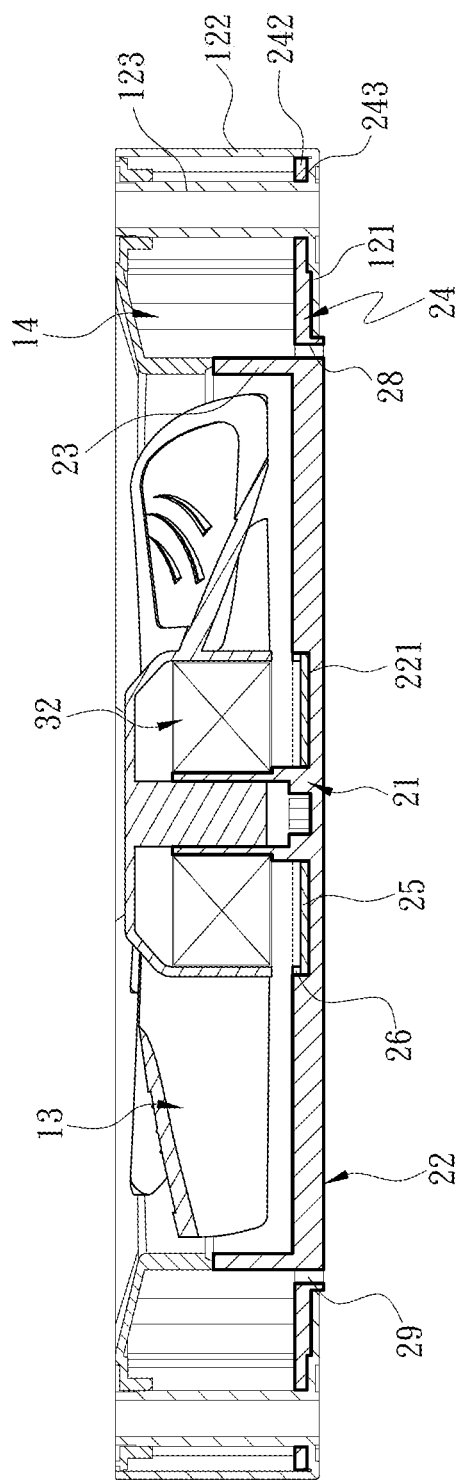
FIG. 3 is a sectional schematic drawing of the first embodiment of the present invention.
Figure 4:
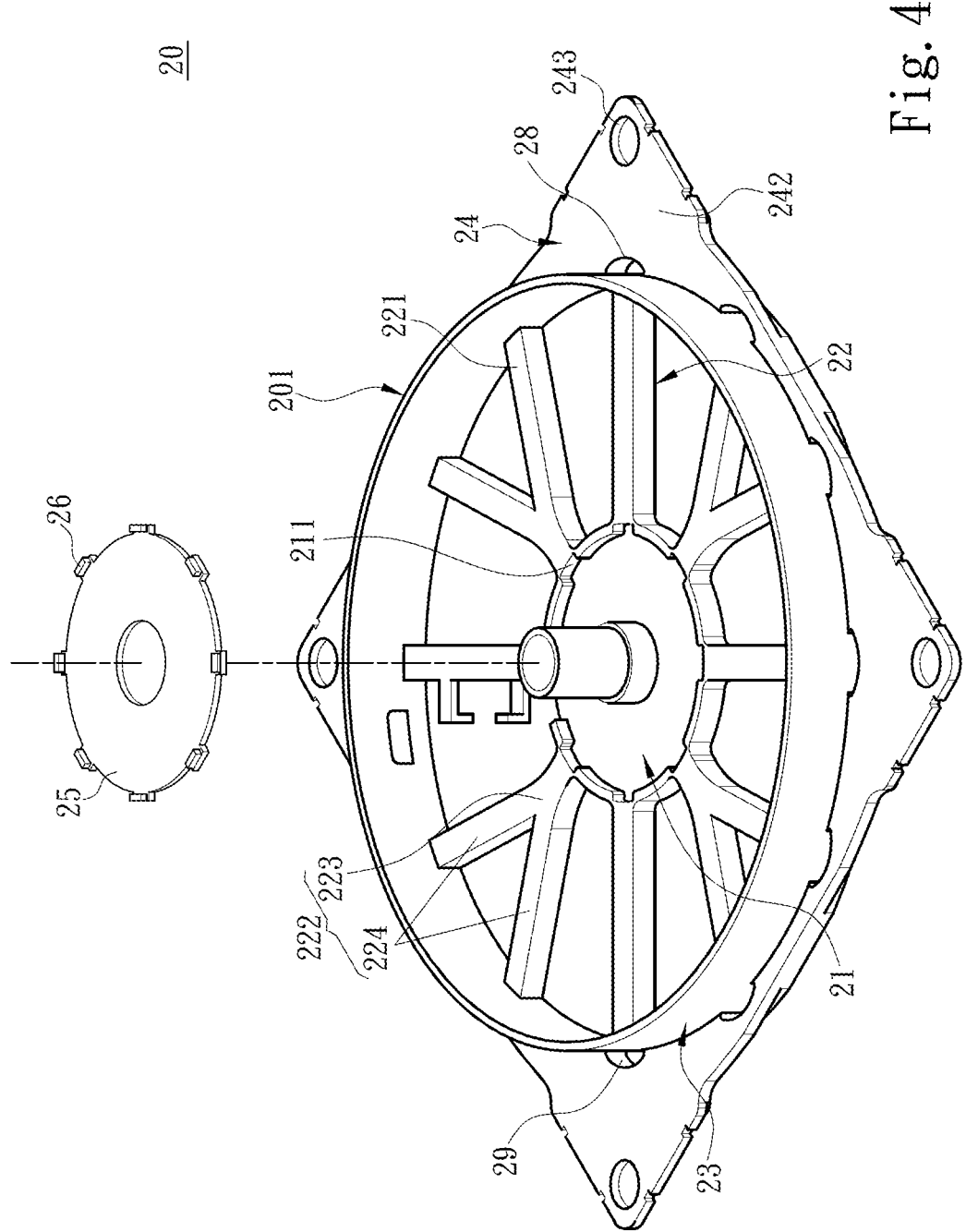
FIG. 4 is a stereoscopic schematic drawing of a light-emitting assembly of the first embodiment of the present invention.
Figure 5A:
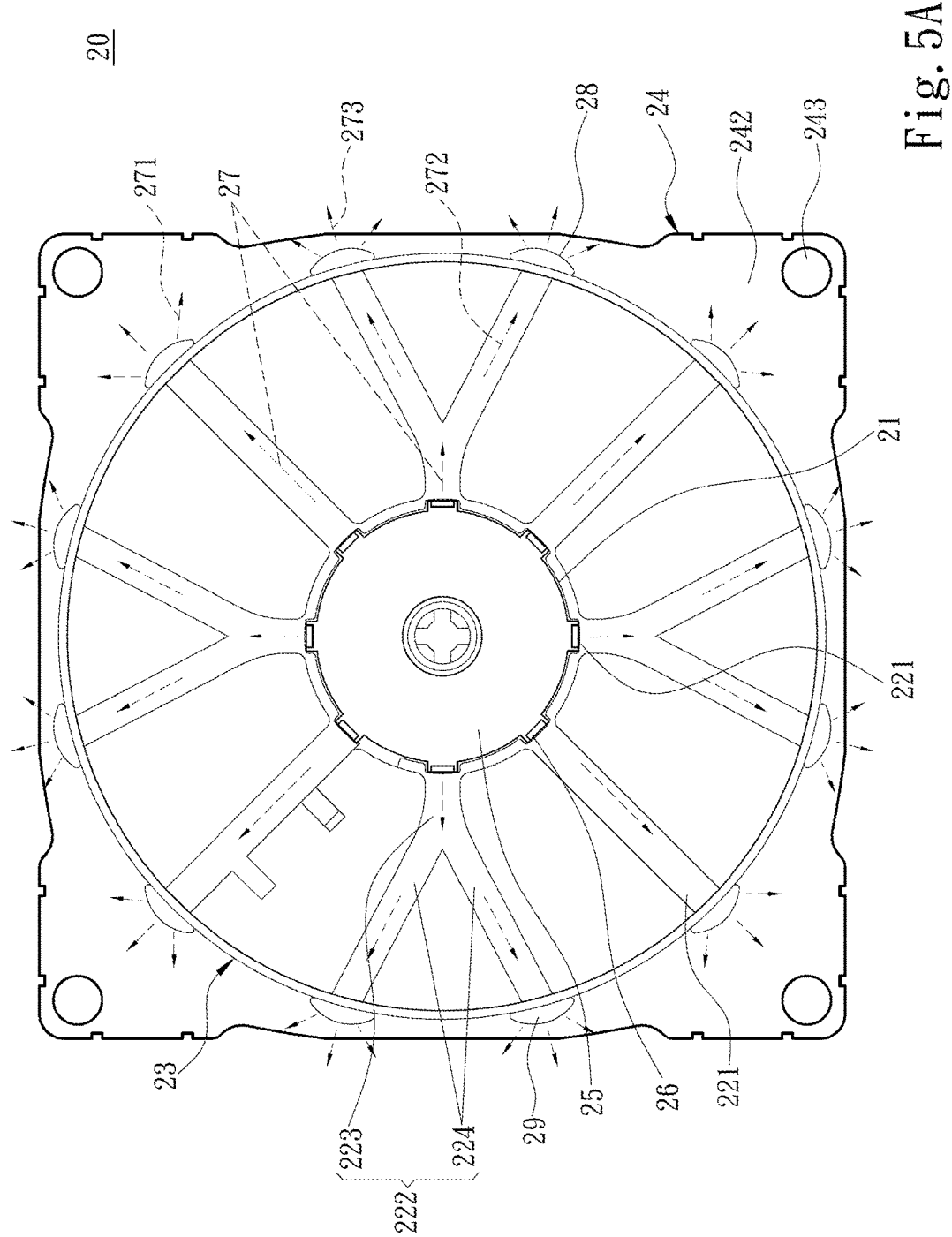
FIG. 5A is a top-view planar schematic drawing of the light-emitting assembly in the first embodiment of the present invention.
Figure 5B:
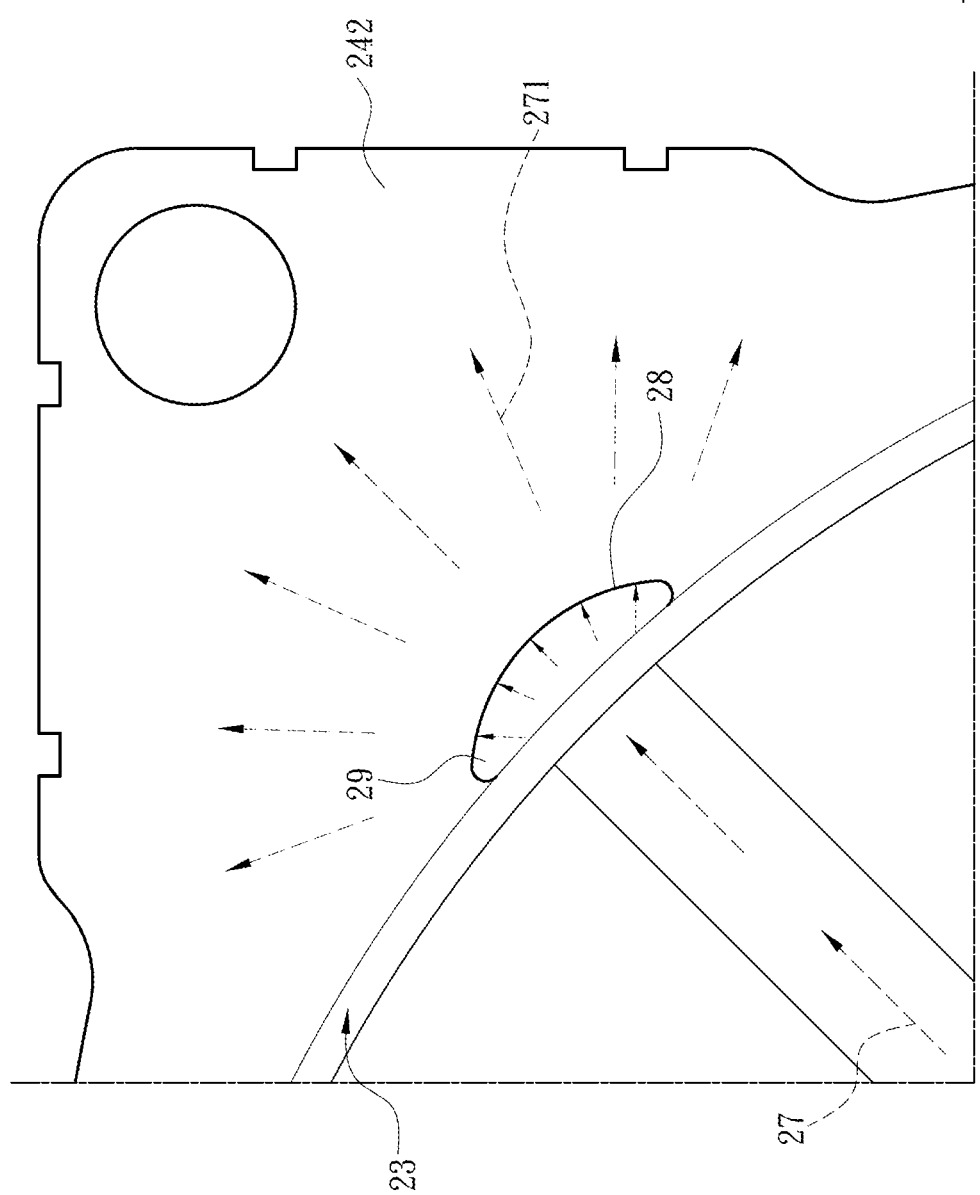
FIG. 5B is an enlarged partial schematic drawing of FIG. 5A.

The detailed description and the technical content of the present invention will now be described in conjunction with the drawings as follows.

First, as shown in FIG. 1, FIG. 2, FIG. 3, FIG. 4, FIG. 5A and FIG. 5B, it can be seen that the present invention provides a cooling fan having a light-emitting effect. The cooling fan comprises a frame body 10, a light-emitting assembly 20 and a fan blade assembly 30.

The frame body 10 comprises an upper cover 11 and a base 12 which forms an installation space 13 and an accommodating space 14 together with the upper cover 11. The base 12 includes a bottom plate 121 and a plurality of outer side plates 122 which extend from the bottom plate 121 and surround the bottom plate 121. The accommodating space 14 surrounds the installation space 13. The base 12 comprises a plurality of first connection portions 123 which are arranged in the accommodating space 14 and project towards the upper cover 11, such that the base 12 and the upper cover 11 are assembled and fixed through the plurality of the first connection portions 123. In the present embodiment, the upper cover 11 and the base 12 may further be made from a light-permeable material, such that the entire frame body 10 is in a light-permeable state, or the upper cover 11 may be made from a light-permeable material while the base 12 is made from a light-tight material, such that the upper cover 11 is in a light-permeable state. When the base 12 is made from the light-tight material, a reflection layer is respectively formed on one side of the bottom plate 121 and the plurality of outer side plates 122 of the base 12 inside the accommodating space 14, so as to increase the reflectivity of the bottom plate 121 and the plurality of outer side plates 122. The reflection layers can be formed by embossing, coating or deposition.

The light-emitting assembly 20 is mounted on the base 12. As shown in FIG. 1, FIG. 2, FIG. 3, FIG. 4, FIG. 5 and FIG. 6, the light-emitting assembly 20 comprises a light guide plate 201 which is made from a light-permeable material, a circuit board 25 arranged on the central light-emitting portion 21, and a plurality of light-emitting elements 26 which are electrically connected with the circuit board 25 to emit a light 27 respectively. The light guide plate 201 includes a central light-emitting portion 21 inside the installation space 13, a plurality of light guide strips 22 which are located inside the installation space 13 and extends outward from the central light-emitting portion 21, a light diffusion portion 23 which surrounds the central light-emitting portion 21 and is connected with the plurality of light guide strips 22, a light diffusion plate 24 which extends from the light diffusion portion 23 and is arranged inside the accommodating space 14, and a first light diffusion portion 28 which is located between the light diffusion portion 23 and the light diffusion plate 24, such that the light-emitting assembly 20 is mounted on the base 12.

A segment gap 211 is formed between each light guide strip 22 and the central light-emitting portion 21. When the circuit board 25 is mounted on the central light-emitting portion 21, each of the plurality of light-emitting elements 26 can be located on the segment gap 211 and correspondingly arranged on one end surface, which is connected with the central light-emitting portion 21, of each light guide strip 22. In the present embodiment, the plurality of light guide strips 22 include a plurality of first light guide strips 221 and a plurality of second light guide strips 222 which are staggered from the first light guide strips 221; each of the first light guide strips 221 is linearly connected between the central light-emitting portion 21 and the light diffusion portion 23; each of the second light guide strips 222 is Y-shaped and comprises a linear first section 223 which extends from the central light-emitting portion 21 and two second sections 224 which extend from the first section 223 respectively and are connected to the light diffusion portion 23.

In the present embodiment, the first diffusion portion 28 is arranged on a position on the light diffusion plate 24 which corresponds to each of the first light guide strips 221 and each of the second sections 224. The first diffusion portion 28 is a semi-concave lens surface, and a gap portion 29 is formed between the first diffusion portion 28 and the light diffusion portion 23, such that the light diffusion plate 24 is spaced from the light diffusion portion 23 via each of the first diffusion portions 28 and each of the gap portions 29. The light diffusion plate 24 is further provided with a plurality of extending diffusion portions 242 which project relative to each of the first light guide strips 221. Each of the extending diffusion portions 242 is arranged at a relative position, which corresponds of the light diffusion portion 23 relative to each of the first light guide strips 221, of the light diffusion portion 23, and a second connection portion 243 which is connected to each of the first connection portions 123 may be respectively arranged at a position on each of the extending diffusion portions 242 relative to each of the first connecting portions 123.

In the present embodiment, although there are four extending diffusion portions 242, four first connection portions 123, four first light guide strips 221, four second light guide strips 222 and four second connection portions 243 respectively, such that the cooling fan is square integrally, the present embodiment is not intended to limit the appearance of the present invention, but the number thereof may vary with the overall appearance.

The fan assembly 30 is arranged in the installation space 13 of the frame body 10 and comprises a fan blade 31, and a driving unit 32 which is used for driving the fan blade 31 to rotate inside the installation space 13, wherein the driving unit 32 is arranged on the central light-emitting portion 21 and electrically connected with the circuit board 25, and the fan blade 31 is sleeved outside the driving unit 32.

When the cooling fan of the present invention is assembled, it is essential that the circuit board 25 of the light-emitting assembly 20 is mounted on the light guide plate 201 first, such that each of the plurality of light-emitting elements 26 is positioned at the end edge, where the segment gap 211 is located, of the central light-emitting portion 21 relative to each of the light guide strips 22, and then the light-emitting assembly 20 is mounted on the base 12. The light-emitting assembly 20 is sleeved outside each of the first connection portions 123 via each of the second connection portions 243, such that the light-emitting assembly 20 can be positioned and assembled on the base 12 indeed. Next, the upper cover 11 is assembled on the base 12, such that the plurality of outer side plates 122 are is annularly around the upper cover 11 to form the installation space 13 and the accommodating space 14. The upper cover 11 comprises a partition wall 111 positioned between the installation space 13 and the accommodating space 14, and one end surface of the partition wall 111 is connected to one end surface of the light diffusion portion 23. The upper cover 11 and the base 12 are assembled to each other indeed through the plurality of first connection portions 123. Then, the driving unit 32 is mounted on the central light-emitting portion 21 and electrically connected with the circuit board 25, and then the fan blade 31 is arranged on the driving unit 32. Finally, the upper cover 11 is assembled on the base 12, i.e., the cooling fan having a light-emitting effect can be assembled.

After the circuit board 25 is connected to an external power source, the circuit board 25 will drive each of the plurality of light-emitting elements 26 to release the light 27 respectively, while the light 27 released from each of the plurality of light-emitting elements 26 is enabled to pass through each of the light guide strips 22 from the segment gap 211 where each of the light guide strips 22 is connected with the central light-emitting portion 21, such that a guide path is formed by using each of the light guide strips 22 to guide the light 27 to the light diffusion portion 23. After passing through the light diffusion portion 23, the light 27 enters the light diffusion plate 24 from the first diffusion portion 28 via the gap portion 29 to form a diffused light (not shown in drawings). However, when the light 27 passes through the first light guide strips 221, it can penetrate through the light diffusion portion 23 directly and pass through the gap portion 29 and then enter the light diffusion plate 24 via the first diffusion portion 28 to form a first diffused light 271. When the light 27 passes through the second light guide strips 222, the light 27 passes through the first section 223 first and is then branched into the two second sections 224 to form a branched light 272 respectively in the two second sections 224. The two branched lights 272 then pass through the corresponding gap portion 29 through the light diffusion portion 23, and then enter the light diffusion plate 24 via the corresponding first diffusion portion 28 to form a second diffused light 273. In other words, the first diffused light 271 and the second diffused light 273 form the diffused light in a direction of the light diffusion plate 24. Since the first diffused light 271 is formed by passing through the light diffusion portion 23 directly using the linear first light guide strips 221 and then passing through the corresponding gap portion 29 and the first diffusion portion 28, and the second diffused light 273 is formed by branching the light 27 to two branched lights 272 through the first section 223 and then passing through the light diffusion portion 23, the corresponding gap portion 29 and the first diffusion portion 28. Therefore, the light intensity of the first diffused light 271 will be larger than that of the second diffused light 273, such that the first diffused light 271 can pass through the corresponding gap portion 29 and first diffusion portion 28 of the light diffusion plate 24 to be guided into each of the extending diffusion portions 242, and further the entire light diffusion plate 24 forms a uniform light-emitting effect. Furthermore, since one end surface of the partition wall 111 is connected to one end surface of the light diffusion portion 23, a part of the first diffused light 271 and the second diffused light 273 can be guided into the upper cover 11 through the light diffusion portion 23, such that the upper cover 11 produces a uniform light-emitting effect.

In addition, when the base 12 is made from a light-permeable material, the bottom plate 121 and the plurality of outer side plates 122 of the base 12 present a uniform light-emitting effect through the first diffused light 271 and the second diffused light 273 which are formed by the light diffusion portion 23 and the first diffusion portion 28, and further any face of the entire frame body 10 presents a uniform reflective effect. On the contrary, when the base 12 is made from a light-tight material, a reflection layer is respectively formed on a side surface of each of the bottom plate 121 and the plurality of outer side plates 122 of the base 12 in the accommodating space 14, and therefore, the first diffused light 271 and the second diffused light 273 can be reflected using the reflection layers, such that the first diffused light 271 and the second diffused light 273 are projected outwards through the upper cover 11 through the reflection effect of the reflection layers, and further the light-emitting effect of the upper cover 11 can be increased.

Figure 6:
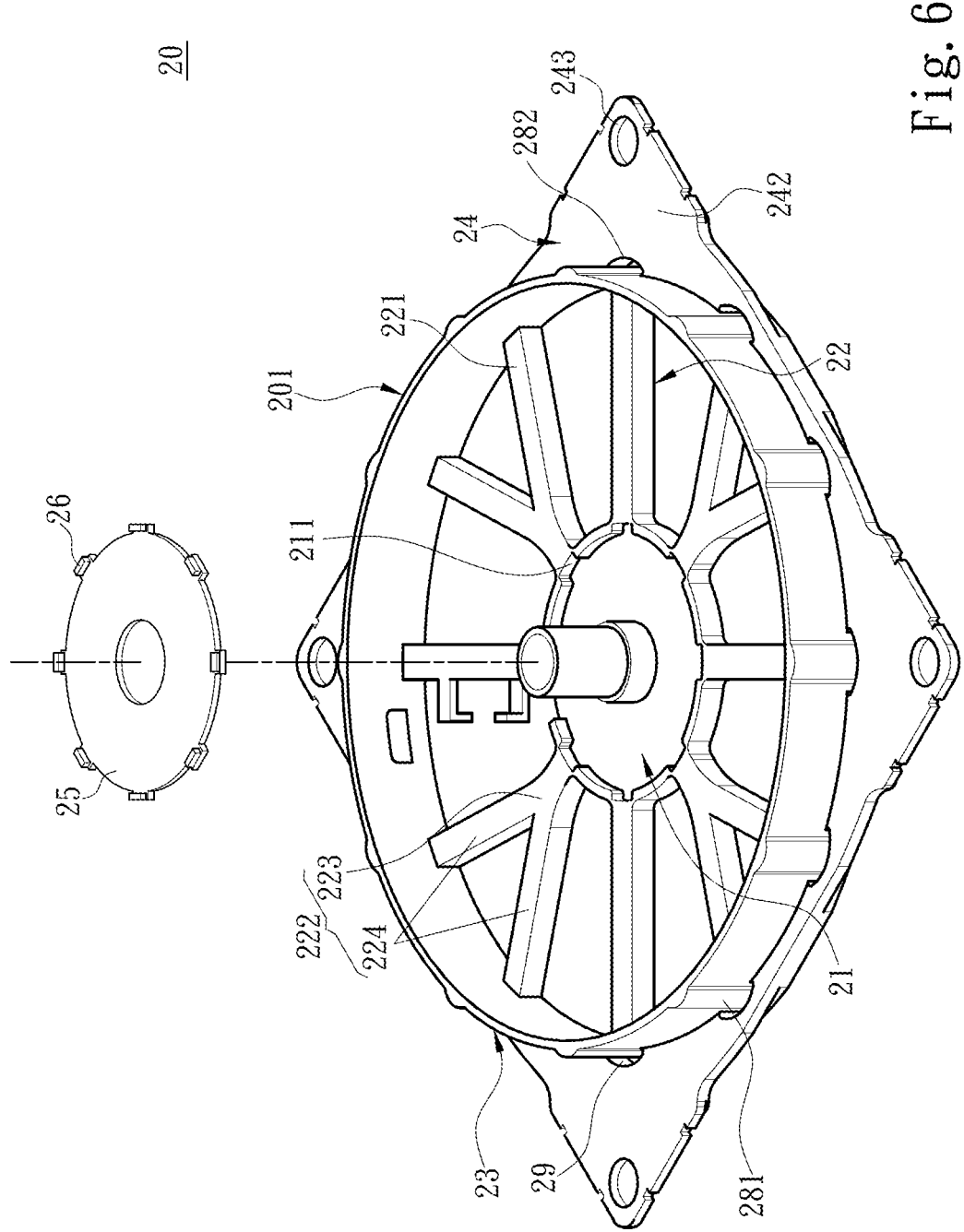
FIG. 6 is a stereoscopic schematic drawing of a light-emitting assembly in a second embodiment of the present invention.
Figure 7A:
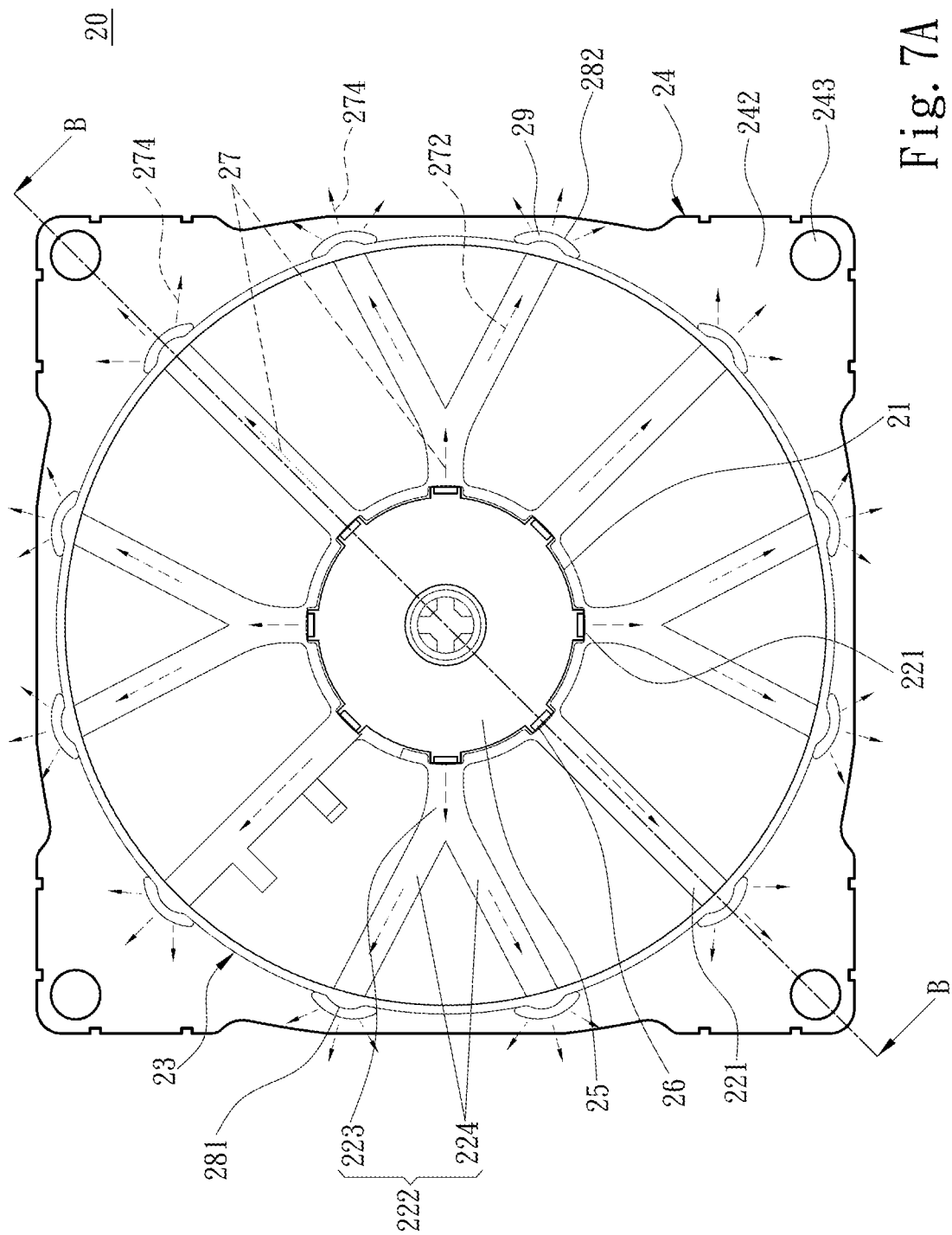
FIG. 7A is a top-view planar schematic drawing of the light-emitting assembly in the second embodiment of the present invention.
Figure 7B:
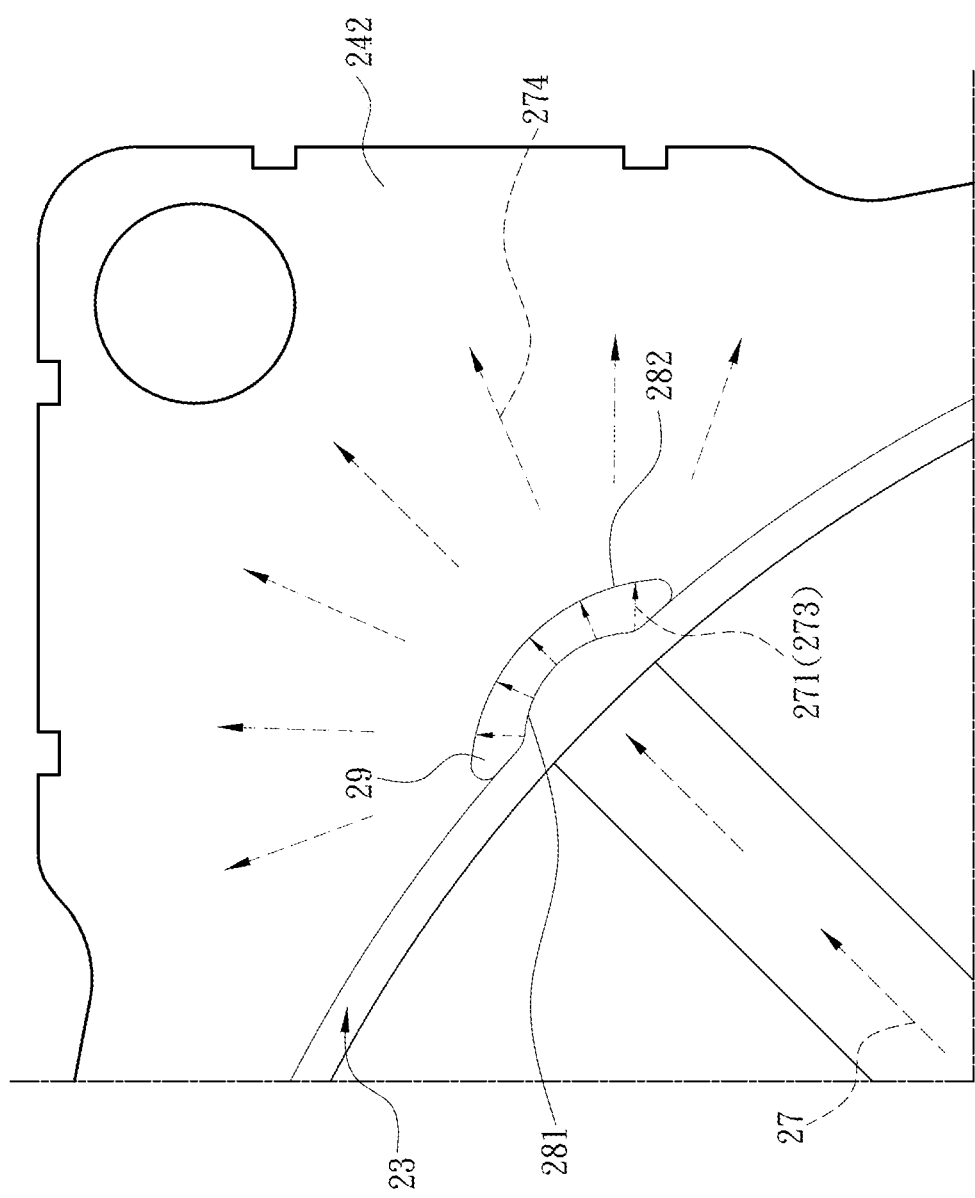
FIG. 7B is an enlarged partial schematic drawing of FIG. 7A.
Figure 8:
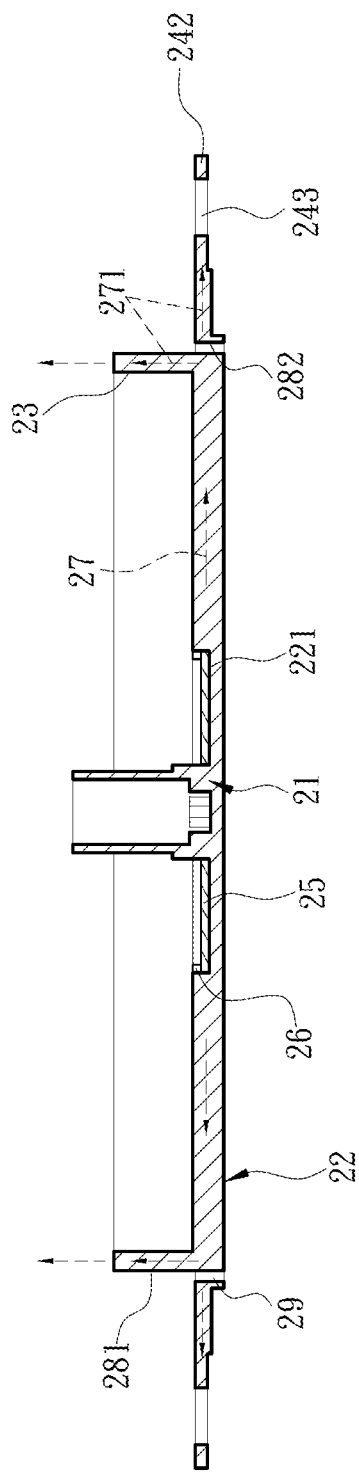
FIG. 8 is a sectional schematic drawing of the light-emitting assembly in the second embodiment of the present invention.

As shown in FIG. 6, FIG. 7 and FIG. 8, there is provided another cooling fan having a light-emitting effect. In the present embodiment, a plurality of first diffusion portions 281 is arranged on the light diffusion portion 23, wherein each of the first diffusion portions 281 is convexly arranged on the light diffusion portion 23 and corresponds to each of the first light guide strips 221 and each of the second sections 224, and the first diffusion portion 281 is a semi-convex lens surface convexly arranged on the light diffusion portion 23.

Therefore, when the light 27 respectively passes through the first light guide strips 221 and the second sections 224 to form the two branched lights 272, the two branched lights 272 will then enter into the light diffusion portion 23 and then pass through the first diffusion portions 281 to form the first diffused light 271 and the second diffused light 273 respectively, and further the entire light diffusion plate 24 forms a uniform light-emitting effect. Furthermore, since the partition wall 111 is connected to one end surface of the light diffusion portion 23, a part of the first diffused light 271 and the second diffused light 273 will be guided into the upper cover 11 via the light diffusion portion 23, such that the upper cover 11 produces a uniform light-emitting effect.

Furthermore, in the present embodiment, a second diffusion portion 282 which corresponds to each of the first diffusion portions 281 is respectively arranged at a position of the light diffusion plate 24 relative to the first diffusion portions 281, and each of the gap portions 29 is formed between each of the first diffusion portions 281 and each of the second diffusion portions 282. In the present embodiment, each of the first diffusion portions 281 is a semi-convex lens surface which is convexly arranged on the light diffusion portion 23, and each of the second diffusion portion 282 is a semi-concave lens surface which is concavely arranged on the light diffusion plate 24.

Accordingly, in the present embodiment, when the light 277 passes through the first light guide strips 221 and the second sections 224 respectively to form the two branched lights 272, and the two branched lights 272 will then enter into the light diffusion portion 23 and next passes through the first diffusion portions 281 to form the first diffused light 271 and the second diffused light 273 respectively, the first diffused light 271 and the second diffused light 273 will pass through the gap portion 29 and form a third diffused light 274 via the second diffusion portion 282, such that the third diffused light 274 is uniformly distributed in the light diffusion plate 24, and further the entire light diffusion plate 24 forms a uniform light-emitting effect.

Therefore, when the base 12 is made from a light-permeable material, the bottom plate 121 and the plurality of outer side plates 122 of the base 12 present a uniform light-emitting effect through the first diffused light 271, the second diffused light 273 and the third diffused light 274 which are formed by the light diffusion portion 23, the first diffusion portion 281 and the second diffusion portion 282, and further any face of the entire frame body 10 presents a uniform reflective effect. On the contrary, when the base 12 is made from a light-tight material, since a reflection layer is respectively formed on a side surface of each of the bottom plate 121 and the plurality of outer side plates 122 of the base 12 in the accommodating space 14, the first diffused light 271, the second diffused light 273 and the third diffused light 274 can be reflected using the reflection layers, such that the first diffused light 271, the second diffused light 273 and the third diffused light 274 are projected outwards through the upper cover 11 through the reflection effect of the reflection layers, and further the light-emitting effect of the upper cover 11 can be increased.

From the above, in the present invention, the frame body 10, the light-emitting assembly 20 and the fan blade assembly 30 form the cooling fan having a light-emitting effect.

Furthermore, the light 27 emitted from the plurality of light-emitting elements 26 is uniformly diffused into the first diffused light 271, the second diffused light 273 and the third diffused light 274 through the plurality of linearly arranged first light guide strips 221, the plurality of Y-shaped second light guide strips 222, the plurality of first diffusion portions 28, 281 and the second diffusion portions 282, such that the single upper cover 11 or the entire frame body 10 can present a uniform light-emitting state via the first diffused light 271, the second diffused light 273 and the third diffused light 274, thereby increasing the visibility when the cooling fan is used.

What is claimed is:

1. A cooling fan having a light-emitting effect, comprising:
    a frame body, including a base and an upper cover which is made from a light-permeable material and forms an installation space together with the base;
    a light-emitting assembly mounted on the base, including a circuit board, a plurality of light-emitting elements which are electrically connected with the circuit board and emit a light respectively, and a light guide plate, wherein the light guide plate includes a plurality of light guide strips which correspond to each of the plurality of light-emitting elements respectively to form a guide path that guides the light, and a light diffusion portion which is connected with the plurality of light guide strips; the light diffusion portion including a first diffusion portion in a position corresponding to each of the plurality of light guide strips, such that the light passes through the guide path to form a diffused light via the first diffusion portion, such that the upper cover is in a uniform light-emitting state; and
    a fan blade assembly arranged in the installation space, including a driving unit which is electrically connected with the circuit board and a fan blade which is driven by the driving unit to rotate in the installation space.

2. The cooling fan having a light-emitting effect according to claim 1, wherein the first diffusion portion is a semi-convex lens that extends outwards from the light diffusion portion.

3. The cooling fan having a light-emitting effect according to claim 2, wherein the plurality of light guide strips further include a plurality of first light guide strips and a plurality of second light guide strips, wherein each of the plurality of first light guide strips extends to the light diffusion portion from each of the plurality of light-emitting elements; and each of the plurality of second light guide strips further comprises a first section which extends from the plurality of light-emitting elements and two second sections which extend to the light diffusion portion from the first section respectively.

4. The cooling fan having a light-emitting effect according to claim 3, wherein the diffused light further comprises a first diffused light and a second diffused light, wherein the first diffused light is formed by passing through the plurality of first light guide strips and then through the first diffusion portion; and the second diffused light is formed by passing through the first sections of the plurality of second light guide strips to form two branched lights and enabling the two branched lights to pass through the second section and then pass through the first diffusion portion.

5. The cooling fan having a light-emitting effect according to claim 1, wherein the light guide plate further comprises a central light-emitting portion in which the circuit board is arranged, and the plurality of light guide strips are connected between the central light-emitting portion and the light diffusion portion.

6. The cooling fan having a light-emitting effect according to claim 1, wherein the light diffusion portion further comprises a light diffusion plate, and the first diffusion portion is located on the light diffusion plate and forms a gap portion with the light diffusion portion.

7. The cooling fan having a light-emitting effect according to claim 6, wherein the first diffusion portion is a semi-concave lens surface.

8. The cooling fan having a light-emitting effect according to claim 7, wherein the plurality of light guide strips further include a plurality of first light guide strips and a plurality of second light guide strips, wherein each of the plurality of first light guide strips extends to the light diffusion portion from each of the plurality of light-emitting elements; and each of the plurality of second light guide strips further comprises a first section which extends from the plurality of light-emitting elements and two second sections which extend to the light diffusion portion from the first section respectively.

9. The cooling fan having a light-emitting effect according to claim 8, wherein the diffused light further comprises a first diffused light and a second diffused light, wherein the first diffused light is formed by passing through the plurality of first light guide strips and then through the first diffusion portion; and the second diffused light is formed by passing through the first sections of the plurality of second light guide strips to form two branched lights and enabling the two branched lights to pass through the second section and then pass through the first diffusion portion.

10. The cooling fan having a light-emitting effect according to claim 6, wherein a first connection portion and a second connection portion which are connected to each other are further arranged between the light diffusion plate and the base.

11. The cooling fan having a light-emitting effect according to claim 10, wherein the base is further made from a light-permeable material, such that the entire frame body is in a uniform light-emitting state using the diffused light.

12. The cooling fan having a light-emitting effect according to claim 10, wherein the base further comprises a bottom plate in which the first connection portion is arranged, and a plurality of outer side plates which are annularly arranged on the bottom plate.

13. The cooling fan having a light-emitting effect according to claim 6, wherein the light guide plate further comprises a central light-emitting portion in which the circuit board is arranged, and the plurality of light guide strips are connected between the central light-emitting portion and the light diffusion portion.

14. The cooling fan having a light-emitting effect according to claim 1, wherein the light diffusion portion further comprises a light diffusion plate, and a second diffusion portion is arranged in a position, which corresponds to the first diffusion portion, on the light diffusion plate; and a gap portion is formed between the second diffusion portion and the first diffusion portion.

15. The cooling fan having a light-emitting effect according to claim 14, wherein the first diffusion portion is a semi-convex lens, and the second diffusion portion is a semi-concave lens portion.

16. The cooling fan having a light-emitting effect according to claim 15, wherein the plurality of light guide strips further include a plurality of first light guide strips and a plurality of second light guide strips, wherein each of the plurality of first light guide strips extends to the light diffusion portion from each of the plurality of light-emitting elements; and each of the plurality of second light guide strips further comprises a first section which extends from the plurality of light-emitting elements and two second sections which extend to the light diffusion portion from the first section respectively.

17. The cooling fan having a light-emitting effect according to claim 16, wherein the diffused light further includes a first diffused light, a second diffused light and a third diffused light, wherein the first diffused light is formed by passing through the plurality of first light guide strips and then through the first diffusion portion; the second diffused light is formed by passing through the first sections of the plurality of second light guide strips to form two branched lights and enabling the two branched lights to pass through the second sections and then pass through the first diffusion portion; and the third diffused light is formed by enabling the first diffused light and the second diffused light to pass through the second diffusion portion.

18. The cooling fan having a light-emitting effect according to claim 14, wherein the light guide plate further comprises a central light-emitting portion in which the circuit board is arranged, and the plurality of light guide strips are connected between the central light-emitting portion and the light diffusion portion.

19. The cooling fan having a light-emitting effect according to claim 14, wherein a first connection portion and a second connection portion which are connected to each other is further arranged between the light diffusion plate and the base.

20. The cooling fan having a light-emitting effect according to claim 19, wherein the base is further made from a light-permeable material, such that the entire frame body is in a uniform light-emitting state using the diffused light.

\* \* \* \* \*